United States Patent
Luo et al.

(10) Patent No.: US 7,987,360 B2
(45) Date of Patent: Jul. 26, 2011

(54) METHOD FOR IMPLEMENTING GROUPING DEVICES AND INTERACTING AMONG GROUPED DEVICES

(75) Inventors: Yujin Luo, Beijing (CN); Yang Liu, Beijing (CN); Mingliang Guo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1307 days.

(21) Appl. No.: 11/568,443

(22) PCT Filed: Jan. 21, 2005

(86) PCT No.: PCT/CN2005/000093
§ 371 (c)(1),
(2), (4) Date: Oct. 27, 2006

(87) PCT Pub. No.: WO2005/107162
PCT Pub. Date: Nov. 10, 2005

(65) Prior Publication Data
US 2007/0223398 A1    Sep. 27, 2007

(30) Foreign Application Priority Data
Apr. 28, 2004   (CN) .......................... 2004 1 0037708

(51) Int. Cl.
*H04L 29/06* (2006.01)
(52) U.S. Cl. ......... 713/163; 713/155; 380/277; 380/271
(58) Field of Classification Search .................. 709/209, 709/208; 710/110; 712/31; 713/155, 163; 380/278, 271, 277
See application file for complete search history.

(56) References Cited

U.S. PATENT DOCUMENTS
7,068,789 B2 *  6/2006  Huitema et al. .............. 380/277
(Continued)

FOREIGN PATENT DOCUMENTS
JP         07-066803 A       3/1995
(Continued)

OTHER PUBLICATIONS
Brent A. Miller, Chatschik Bisdikian: Bluetooth Revealed, Prentice Hall Ptr, Upper Saddle, NJ 07458, U.S.A., XP002552119, pp. 20-28, 95-123 (2002).
(Continued)

*Primary Examiner* — Gilberto Barron, Jr.
*Assistant Examiner* — Virginia Ho
(74) *Attorney, Agent, or Firm* — Dickstein Shapiro LLP (57) ABSTRACT

In a method for implementing device grouping and interactions between grouped devices a device creating a device group sends an advertisement message carrying identification information of a device group to which it belongs, to the network. After receiving the advertisement message, a network device joins the device group by the corresponding advertisement message. When two grouped network devices interact with each other, the method further comprises: sending an access request to an accessed device; judging by the accessed device whether the device sending the request is a trusted device and if so, interacting by both parties with each other; otherwise, denying the access request, or determining by the initiating device and the accessed device, a common trusted third party; acquiring by the initiating device, key information of the accessed device from the common trusted third party, and interacting with the accessed device by using the acquired key information.

17 Claims, 6 Drawing Sheets

U.S. PATENT DOCUMENTS

| | | | |
|---|---|---|---|
| 7,640,485 B1 * | 12/2009 | Hardie et al. | 714/776 |
| 2002/0059420 A1 | 5/2002 | Deng et al. | |
| 2003/0044020 A1 * | 3/2003 | Aboba et al. | 380/278 |
| 2003/0163689 A1 * | 8/2003 | Xu et al. | 713/163 |

FOREIGN PATENT DOCUMENTS

| | | |
|---|---|---|
| JP | 10-210027 A | 8/1998 |
| JP | 11-275106 A | 10/1999 |
| JP | 2004-064646 A | 2/2004 |
| JP | 2004-102531 A | 4/2004 |

OTHER PUBLICATIONS

J. Philip Craiger, "802.11, 802.1x and Wireless Security", GIAC Security Essential Certification (GSEC), Practical Assignment, Version 1.4, , XP007910289, pp. 1-16 (Jun. 2002).

International Search Report dated Apr. 28, 2005.

* cited by examiner

METHOD FOR IMPLEMENTING GROUPING DEVICES AND INTERACTING AMONG GROUPED DEVICES

BACKGROUND OF THE INVENTION

1. Field of the Invention

The present invention relates to a device management technology, and more particularly, to a method for grouping devices on a network and implementing interactions between the grouped devices.

2. Description of the Prior Art

Presently, in many networks, devices therein are grouped according to a specific feature, such as addresses of the devices, services provided thereby, in order to facilitate the management of devices of the same type or having common features.

However, there are some drawbacks in the existing device grouping management: 1) one and the same device can not join in multiple groups with different identities, once a device is classified into a group, then its identity is fixed; 2) any two devices in one group or different groups do not have a trusted relationship, and thus if a desired service requires a secure authentication, these two devices can not communicate with each other, so these two devices can not achieve a resource sharing.

Therefore, the device grouping schemes in the prior art can neither provide flexible interactions between devices nor guarantee secure communication and resource sharing between any two devices.

SUMMARY OF THE INVENTION

In view of the above, a major object of the present invention is to provide a method for implementing device grouping and interactions between grouped devices, which can support one and the same device to join in different groups while facilitating the device management, and can achieve secure authentication based communication interactions between any devices.

To achieve the above objects, the present invention is implemented as follows.

A method for implementing device grouping and interactions between grouped devices, wherein in a network, a device creating a device group sends an advertisement message carrying identification information of a device group to which it belongs, to the network; and after receiving the advertisement message, a network device which wants to join in the corresponding device group joins in the device group identified by the corresponding advertisement message, when two network devices interact with each other, the method further comprising:

sending by an initiating device, an access request to an accessed device; judging by the device receiving the access request, whether the device sending the request is a trusted device thereof or not, if so, interacting by both parties with each other; otherwise, denying the access request, or determining a common trusted third party together with the initiating device; acquiring by the initiating device, key information of the accessed device from the common trusted third party, and interacting with the accessed device by using the acquired key information.

In the above solution, said device group is a peer-to-peer device group, and joining in the device group identified by the advertisement message comprises: adding by the network device requesting to join in the device group, the device group identification carried by the advertisement message into its own device group identification.

In the above solution, said device group is a master-slave device group, and joining in the device group identified by the advertisement message comprises: sending by the network device requesting to join in the device group, a join-in request to a master device in the device group to be joined in; determining by the master device, based on preset information, whether the device initiating the current request is allowed to join in, and returning a response message carrying an authorization result to the device initiating the current request. Wherein, if the authorization result in the response message is "deny to join-in", then the message further carries information on deny reasons.

In the above solution, said accessed device belongs to a master-slave device group, and determining by the initiating device and the accessed device, a common trusted third party comprises: judging by the initiating device, whether it belongs to one and the same master-slave device group as the accessed device, if so, using a master device as the common trusted third party; otherwise, joining by the initiating device, as a slave device, in a master-slave device group to which the accessed device belongs, and then using a master device of the master-slave device group in which it joins as the common trusted third party.

In the above solution, said initiating device belongs to a master-slave device group, said accessed device belongs to a peer-to-peer device group, and determining by the initiating device and the accessed device, a common trusted third party comprises: joining by the accessed device, as a slave device, in a master-slave device group to which the initiating device belongs, and then using a master device of the master-slave device group in which it joins as the common trusted third party.

Prior to joining by the initiating device or the accessed device in the new master-slave device group, it further comprises: acquiring by the initiating device or the accessed device, description information of the opposite device from the opposite device.

In the above solution, said initiating device and accessed device both belong to a peer-to-peer device group, and determining by the initiating device and the accessed device, a common trusted third party comprises: informing by the initiating device, all trusted third parties thereof to the accessed device; judging by the accessed device, whether there are any same trusted third parties as its own in all the trusted third parties of the initiating device; if so, selecting one of the same ones as the common trusted third party.

The method further comprises: after acquiring the key information of the accessed device, sending by the initiating device, the key information to the accessed device.

In the above solution, the initiating device acquires both an encryption key encrypted by a key shared between the common trusted third party and the initiating device and an encryption key encrypted by a key shared between the common trusted third party and the accessed device, and then sends the encryption key encrypted by the key shared between the common trusted third party and the accessed device to the accessed device.

The method for implementing device grouping and interactions between grouped devices according to the present invention, based on the existing network architectures, groups and manages various devices joining in the network, such as PC, laptop computer, PDA, printer, projector, television, mobile phone and so on. When two devices requiring communication or resource sharing do not belong to one and the same group, one device may be allowed to simultaneously join in the group to which the other device belong, so as to change interactions between two groups into interactions within one group, thereby providing a flexible mechanism for communication interactions and resource sharing between the grouped devices. Further, when there is no trusted relationship between two devices requiring communication or service invocation, these two devices may search for a third party trustable by both parties and establish communication interactions therebetween through the secure authentication of the third party.

The above solution of simultaneously joining in different device groups with different identities and the solution of performing secure communication between any devices through the secure authentication of the third party may apply to any multiple devices requiring simultaneous interactions. In other words, the present invention provides a method of correspondingly generating and managing device groups which can form an ad hoc network without central management or a network structure with central management requirements according to different requirements of the users, so as to achieve secure communication and resource sharing between any grouped devices.

DETAILED DESCRIPTION OF THE PREFERRED EMBODIMENTS

The present invention groups devices in a network into device groups of different logical structures according to certain rules, for example, generating device groups having a peer-to-peer structure or devices groups having a master-slave structure. In respective types of device groups, the devices follow different rules, methods for interacting between the devices are different, relationships between the devices are different, and different requirements for managing the network devices are met. The present invention regards the device groups as a device management mechanism, and the management functions of the device groups on the devices are as follows.

1) The device group represents as a collection of devices externally and is a complete entity. The devices in the device group can commonly provide some functions externally according to different cooperative interaction rules, and advertise the functions cooperatively provided by the grouped devices to the network through a description of the device group, so that a user may obtain a desired function by searching a corresponding device group.

2) A certain device in the device group is used as an interface for communicating externally of other devices in the device group.

3) A certain device in the device group is used as a trusted third party of all devices in the device group, for providing secure supports for interactions between the grouped devices.

In the present invention, two types of device groups are mainly proposed, one is a peer-to-peer device group, the other is a master-slave device group, and each group has a unique device group identification. Wherein, the peer-to-peer device group refers to a device group the respective devices in which have a peer-to-peer relationship and any two devices in the peer-to-peer device group have a direct interaction which is not controlled by other device. The major purpose thereof is to perform grouping management of the devices, and those devices which want to join in the peer-to-peer device group need no identity authentication procedure, if only set the device group identifications within the devices into an identification of the target device group. The peer-to-peer device group shall advertise its information to the network in the lifecycle without any interruption, so as to be found by other devices on the network, and the device initiating the advertisement can be the device creating the peer-to-peer device group.

The master-slave device group refers to a device group in which a master device is included in the group. The master device manages the creation and dismission of the device group and controls the join-in of slave devices, and can acquire information for managing all devices in the device group and resources on the devices. The master-slave device group shall advertise its information to the network in the lifecycle without any interruption, so as to be found by other devices on the network, and the device initiating the advertisement can be the master device of the device group.

When a device does not join in any one of the device groups, the interactions between the devices are peer-to-peer. The device may find other devices belonging and/or not belonging to a certain device group in the network, and currently existing peer-to-peer and master-slave device groups. One device may join in one or more peer-to-peer and/or master-slave device groups if necessary.

Figure 1:
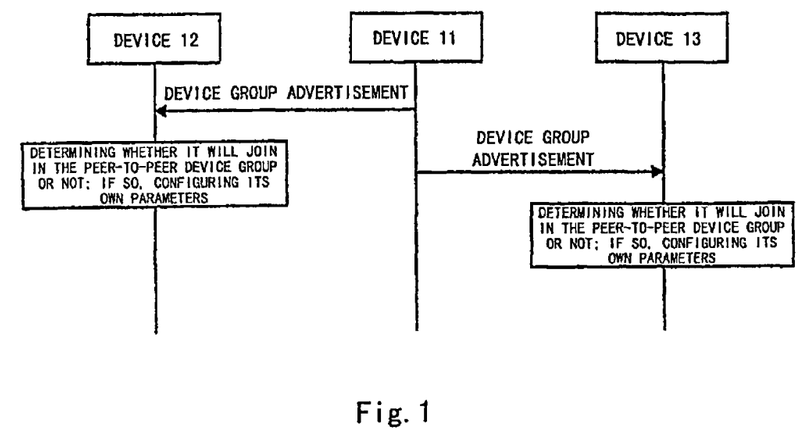
FIG. 1 shows a procedure of establishing a peer-to-peer device group.
Figure 2:
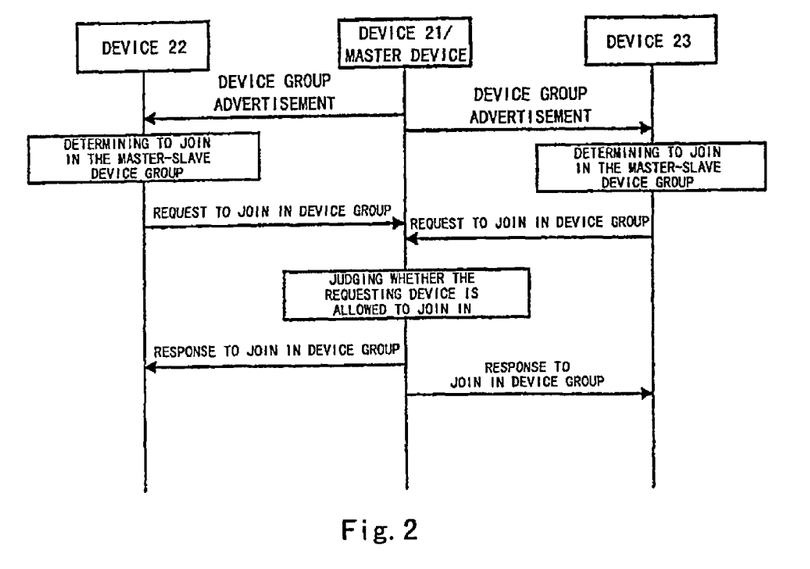
FIG. 2 shows a procedure of establishing a master-slave device group.

The present invention proposes a concept of the device group, and thus relates to procedures such as device group establishment, device group dismission, device group advertisement and interactions between devices within one and the same device group and between devices of different groups. Wherein, the procedures of device group establishment and advertisement are shown in FIG. 1 and FIG. 2. FIG. 1 shows a procedure of establishing a peer-to-peer device group, and FIG. 2 shows a procedure of establishing a master-slave device group. A certain device firstly establishes a peer-to-peer or master-slave device group, and then performs a device group advertisement to the network. A device receiving the device group advertisement can join in a desired device group at any time by setting its own parameters or sending a request.

Any one of the devices in the network may create a peer-to-peer device group. The indication of the creation of the peer-to-peer device group is that there is an advertisement message containing the device group identification continuously present in the network. The advertisement message may be sent by the device creating the device group. Thus, other devices may determine whether it will join in the peer-to-peer device group or not after receiving the device group advertisement.

Because the peer-to-peer device group is characterized in that a device joining in the device group need not be identity authenticated, thus when a device attempts to join in a certain peer-to-peer device group, it is enough only to set the device group identification within the device into the identification of the device group to be currently joined in. If a certain device simultaneously joins in several different peer-to-peer device groups, then several device group identifications will be simultaneously set. In actual operations, each peer-to-peer device may be provided with a device group identification list in which one record is added each time the peer-to-peer device joins in one peer-to-peer device group.

As shown in FIG. 1, it is assumed that there are three devices, a device 11, a device 12 and a device 13, in the network. Firstly, the device 11 creates a peer-to-peer device group; thereafter, the device 11 sends an advertisement message of the device group to the device 12 and the device 13; after receiving the advertisement message, the device 12 and the device 13 set their own parameters if going to join in the peer-to-peer device group. Herein, the structure of the peer-to-peer device group advertisement message is shown as Table 1.

identification is generated by some existing algorithms; or the local MAC address+the creation time of the device group are directly and simply used as the device to group identification, and so on. The device group advertisement expire time is determined by the device which creates the peer-to-peer device group and can be updated at any time.

The respective devices themselves are responsible for the access security between the respective devices within the peer-to-peer device group. A device outside the peer-to-peer device group can also access the devices within the peer-to-peer device group, and the respective devices themselves are also responsible for the access security between the device outside the device group and the devices within the device group.

For the master-slave device group, any one of the devices in the network may create a master-slave device group. The indication of the creation of the master-slave device group is that there is an advertisement message containing the device group identification continuously present in the network. The

TABLE 1

| MESSAGES | DESCRIPTION OF MESSAGE FIELDS |
|---|---|
| M-NOTIFY/IGRS HTTP/1.1 | Extended HTTP Command Line |
| Host:239.255.255.250:1900 | IP Address and Port Number of Target Device |
| DeviceGroupId | Device Group Identification |
| DeviceGroupName | Device Group Name |
| DeviceGroupAdvertisementExpireTime | Device Group Advertisement Expire Time If device receiving the message receives no new device group advertisement message when time indicated by this field is reached, then the device group is regarded not to exist. |
| DeviceGroupType | Device Group Type Indicating device group sending the advertisement is a peer-to-peer device group or a master-slave device group. |
| DeviceGroupDesc | Device Group Description Describing the functional interfaces provided by the device group. |

In Table 1, the device group identification DeviceGroupId uniquely identifies one device group. In the advertisement message of the peer-to-peer device group, the device group type DeviceGroupType is a peer-to-peer device group. In Table 1, the device group identification and device group name are generated from the device itself which creates the peer-to-peer device group. For example, the device group advertisement message may be sent by the device creating the device group, the device functioning as the master device of the master-slave device group. Thus, other devices may determine whether it will join in the master-slave device group or not after receiving the device group advertisement. Herein, the structure of the master-slave device group advertisement message is shown as Table 2.

TABLE 2

| MESSAGES | DESCRIPTION OF MESSAGE FIELDS |
|---|---|
| M-NOTIFY/IGRS HTTP/1.1 | Extended HTTP Command Line |
| Host:239.255.255.250:1900 | IP Address and Port Number of Target Device |
| DeviceGroupId | Device Group Identification |
| DeviceGroupName | Device Group Name |
| DeviceGroupAdvertisementExpireTime | Device Group Advertisement Expire Time Required field with a type of 32 bit unsignedInt If device receiving the message receives no new device group advertisement message when time indicated by this field is reached, then the device group is regarded not to exist; master device shall issue a new device group advertisement to refresh this time before the advertisement expire time arrives. |

TABLE 2-continued

| MESSAGES | DESCRIPTION OF MESSAGE FIELDS |
| --- | --- |
| ControllerId | Master Device Identification |
| DeviceGroupType | Device Group Type Indicating device group sending the advertisement is a peer-to-peer device group or a master-slave device group. |
| DeviceGroupDesc | Device Group Description Describing the functional interfaces provided by the device group. |

When a device attempts to join in a certain master-slave device group, the device is required to initiate a request to join in the device group to a master device of the master-slave device group. After these two devices perform the identity authentication, the master device allows or denies the request to join in the device group from the device according to the authorization check for joining in the device group. If it is allowed, the corresponding device joins the master-slave device group as a slave device, and the slave device will add a corresponding device group identification therein, and the master device will also record relevant information of the corresponding salve device. Wherein, the structures of the request message to join in the device group and the response message to join in the device group are respectively shown as Table 3 and Table 4.

TABLE 3

| MESSAGES | DESCRIPTION OF MESSAGE FIELDS |
| --- | --- |
| M-NOTIFY/IGRS HTTP/1.1 | Extended HTTP Command Line |
| Host | IP Address and Port Number of Target Device |
| DeviceGroupId | Identification of Device Group to Be Joined In |
| SourceDeviceId | Identification of Device Requesting to Join In |
| TargetDeviceId | Master Device Identification |
| SequenceId | Sequence Number of Request Message |

TABLE 4

| MESSAGES | DESCRIPTION OF MESSAGE FIELDS |
| --- | --- |
| HTTP/1.1 200 OK Ext Cache-control:no-cache="Ext" | HTTP Command Line |
| SourceDeviceId | Master Device Identification |
| TargetDeviceId | Identification of Device Issuing Join-in Request |
| ReturnCode | Response State Code Indicating whether request is allowed or not |
| DeviceGroupId | Identification of Device Group to Be Joined In |
| AcknowledgeId | Sequence Number of Response Message Corresponding to sequence number of request message |

As shown in FIG. 2, it is assumed that there are three devices, a device 21, a device 22 and a device 23, in the network. The device 21 creates a master-slave device group, at this time, the device 21 is the master device of the master-slave device group; thereafter, the device 21 sends an advertisement message of the device group to the device 22 and the device 23; after receiving the advertisement message, the device 22 and the device 23 want to join in the master-slave device group, and then the device 22 and the device 23 respectively send requests to join in the device group. After performing the identity authentication respectively with the device 22 and the device 23, the device 21 determines whether the device 22 and the device 23 are allowed to join in the device group according to preset conditions, and sends the results to the device 22 and the device 23 through responses to join in the device group. If it is "deny to join-in", then the response message may further carry deny reasons. Wherein, identifications of the devices allowed to join-in can be formed into a list which is placed in the master device.

In the master-slave device group, each slave device in the master-slave device group regards the master device as a trusted third party, and the authentication service is provided by the master device.

A device outside the master-slave device group can also access the devices within the master-slave device group, and the respective devices themselves are responsible for the access security between the device outside the device group and the devices within the device group. When the devices in the master-slave device group interact with each other, either the respective devices themselves or the authentication service of the trusted third party provided by the master device can be responsible for the access security, herein, the trusted third party is the master device itself.

Corresponding to the establishment of the device group, the dismission of the device group exists. For the dismission of the peer-to-peer device group, it refers to that when there is no advertisement message of a certain peer-to-peer device group in the network, the peer-to-peer device group is in a dismission state, and the possible reason consists in that there is no device in the device group. Generally, the advertisement of the peer-to-peer device group is conducted by the device creating the peer-to-peer device group, and at this time, other devices in the peer-to-peer device group do not perform the advertisement of the device group.

When other devices in the peer-to-peer device group can not receive the advertisement of the device group, one device may be newly elected according to a certain rule for taking charge of the advertisement of the device group. So, when there is no advertisement of the peer-to-peer device group finally, it is only possible that there is no device in the device group.

For the dismission of the master-slave device group, when there is no advertisement message of a certain master-slave device group, the master-slave device group is in a dismission state, and the possible reason consists in that the master device of the master-slave device group exits from the network. Generally, the advertisement of the master-slave device group is conducted by the master device in the master-slave device group, and at this time, other devices in the master-slave device group do not perform the advertisement of the device group.

Figure 3:
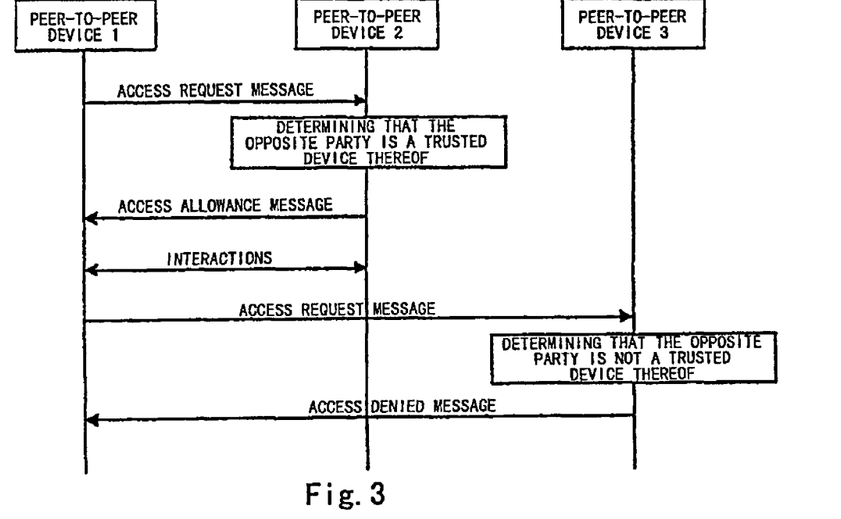
FIG. 3 is a diagram of an embodiment for interactions between devices within a peer-to-peer device group.

The interactions between devices within the peer-to-peer device group are as shown in FIG. 3. The embodiment of FIG.

3 includes three peer-to-peer devices, a peer-to-peer device 1, a peer-to-peer device 2 and a peer-to-peer device 3. The peer-to-peer device 1 and the peer-to-peer device 2 have a trusted relationship, but the peer-to-peer device 1 and the peer-to-peer device 3 has no trusted relationship.

When the peer-to-peer device 1 is going to access the peer-to-peer device 2, the peer-to-peer device 1 sends an access request message to the peer-to-peer device 2. The peer-to-peer device 2 finds that the opposite party is a trusted device thereof and thus returns a response to allow access back to the peer-to-peer device 1. Then, the both parties begin the interactions with each other. During the interactions, both devices themselves are responsible for the secure authentication therebetween. When the peer-to-peer device 1 is going to access the peer-to-peer device 3, the peer-to-peer device 1 sends an access request message to the peer-to-peer device 3. The peer-to-peer device 3 finds that the opposite party is not a trusted device thereof and thus returns a response to deny access back to the peer-to-peer device 1.

Figure 9:
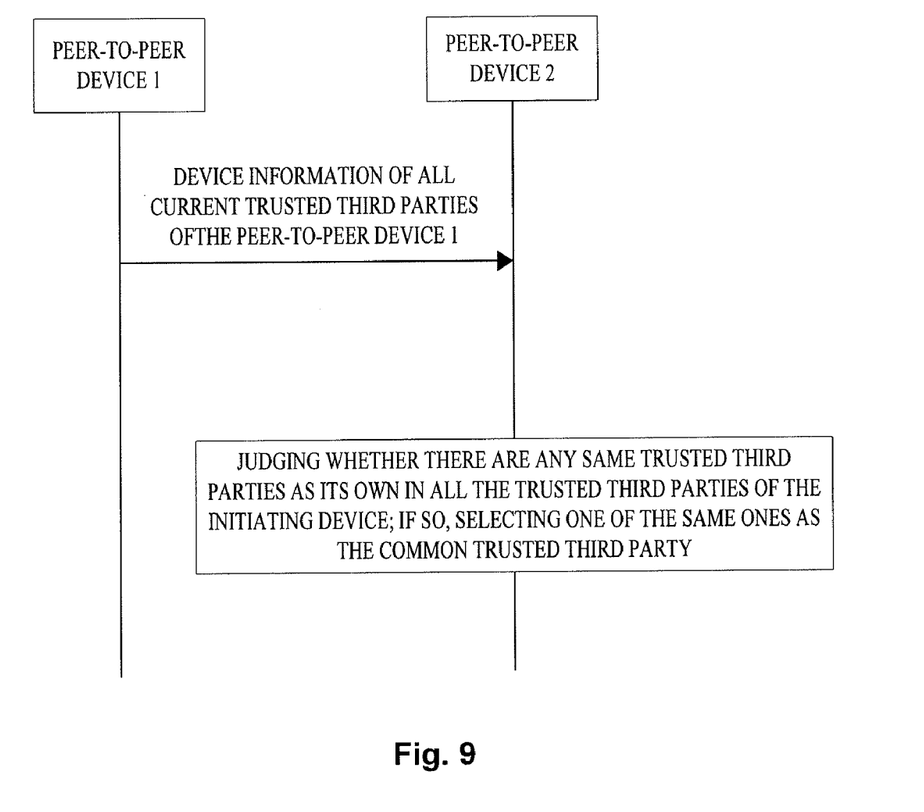
FIG. 9 is a diagram of an embodiment for interactions between devices within a peer-to-peer device group.

In a case where there is no trusted relationship between two peer-to-peer devices, if the secure communication is to be performed between these two peer-to-peer device, it can also be achieved through a trusted third party. Thus, for example, if the peer-to-peer device 1 is going to access the peer-to-peer device 2 without a trusted relationship, as shown in FIG. 9, then the procedure of determining a common trusted third party can be as follows: the peer-to-peer device 1 informs device information of all current trusted third parties thereof to the peer-to-peer device 2; after receiving, the peer-to-peer device 2 judges whether one or more device(s) therein is/are also its trusted third party/parties; if so, then the peer-to-peer device 2 arbitrarily selects one as the common trusted third party, and thereafter feedbacks the selected device information to the peer-to-peer device 1; the peer-to-peer device 1 acquires an authorization to access the peer-to-peer device 2 from the trusted third party and further accesses the peer-to-peer device 2; if not, then the peer-to-peer device 2 returns failure information or information about not finding a common trusted third party to the peer-to-peer device 1. Certainly, the peer-to-peer device 1 and the peer-to-peer device 2 can be exchanged in the above procedure of determining a common trusted third party, that is, the peer-to-peer device 2 performs the informing, and the peer-to-peer device 1 judges and selects the common trusted third party.

In the master-slave device group, the master device will buffer resources information on all slave devices in the device group, and a slave device can find resources information on other slave devices in the device group. When the interactions are performed between the salve devices in the master-slave device group, a trusted relationship based on a common trusted third party can be established between the slave devices initially having no trusted relationship by aids of the authentication service provided by the master device which is a common trusted third party of all the slave devices, so as to achieve the interactions between any two slave devices through the trust check. Certainly, if there is another common trusted third party other than the master device between the two slave devices, similarly, the trust check can be conducted by using any one of the common trusted third parties so as to perform the interaction.

Figure 4:
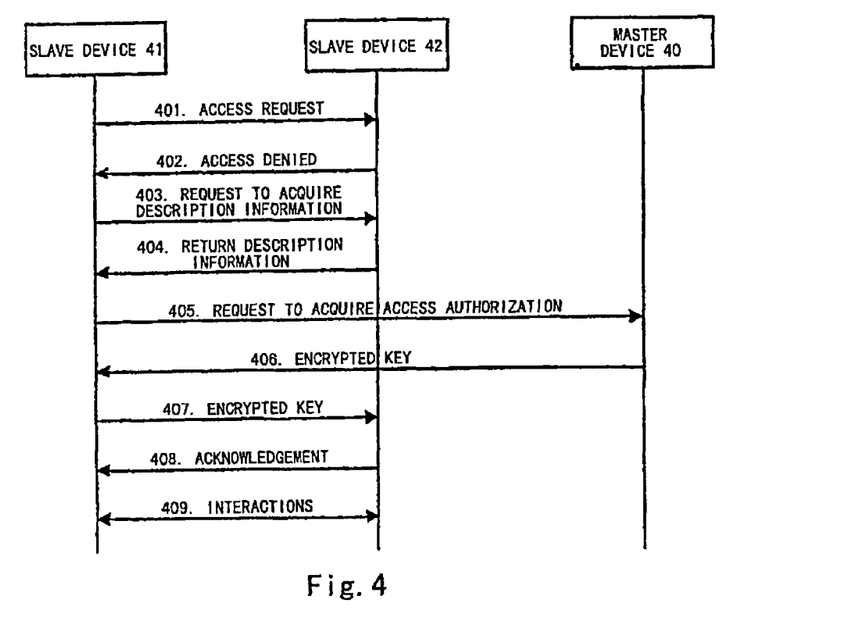
FIG. 4 is a diagram of an embodiment for interactions between devices within a master-slave device group.

As shown in FIG. 4, there is no trusted relationship between a slave device 41 and a slave device 42 in the master-slave device group, but there is a common trusted third party, a master device 40. Then, when the slave device 41 is going to access the slave device 42, the following steps are involved:

Steps 401-402: the slave device 41 initiates an access request message to the slave device 42; and the slave device 42 finds that the salve device 41 is not a trusted device thereof so returns a response to deny the access.

Steps 403-404: the slave device 41 sends a request to acquire a device description of the slave device 42 to the slave device 42; after receiving, the slave device 42 sends its own device description information in which information on its trusted third parties is contained, to the slave device 41, the description information of the slave device 42 is for example shown as follows:

<DeviceDescription>
<DeviceId>Slave Device 42 Id</DeviceId>
<DeviceSecurityDescription>
<DeviceSecurityId>
urn: 3rdPartyAuthenService:3rdAuthProtocol_Kerberosv5: RSA-1024: AuthenServiceProvider: Master Device Identification: Authentication Service Identification Provided: AES-128-128: MD5
</DeviceSecurityId>
</DeviceSecurityDescription>
. . .

Step 405: based on the identification of the trusted third party and authentication service identification provided in the device description of the slave device 42, the slave device 41 initiates an authorization request for acquiring the access to the slave device 42, to the authentication service of the trusted third party. In the present embodiment, the trusted third party device is the master device 40.

The structure of the authentication request message based on the authentication, message transmission encryption and message authentication mechanism of the trusted third party is shown as Table 5.

TABLE 5

| MESSAGES | DESCRIPTION OF MESSAGE FIELDS |
|---|---|
| M-NOTIFY/IGRS HTTP/1.1 | Extended HTTP Command Line |
| Host | IP Address and Port Number of Target Device Required Field |
| TargetDeviceId | Target Device Identification |
| SourceDeviceId | Source Device Identification |
| SequenceId | Sequence Number of Request Message |
| Device1Id | Slave Device 41 Identification |
| Device2Id | Slave Device 42 Identification |
| Content-type:multipart/byteranges; Boundary=NONCE_TOKEN | |
| Content-length | Length of Message Body |
| --NONCE_TOKEN | |
| Contents of Nonce | |
| --NONCE_TOKEN | |
| Contents of Token | |
| --NONCE_TOKEN-- | |

In the present embodiment, the target device identification in Table 5 is the identification of the master device 40, the source device identification is the identification of the device 41, and the slave device 41 identification and the slave device 42 identification are the identifications of the two devices to perform interactions.

Step 406: since the master device 40 has the trusted relationships with the slave device 41 and the slave device 42, the master device 40 returns to the slave device 41 a message encryption key KEY for performing secure interactions between the slave device 41 and the slave device 42, and the KEY is encrypted with an encryption key KEY1 previously shared between the master device 40 and the slave device 41; at the same time, the KEY is encrypted with an encryption key KEY2 shared between the master device 40 and the slave device 42; and then these two respectively encrypted keys are sent to the slave device 41 through an authentication response message.

The structure of the authentication response message based on the authentication, message transmission encryption and message authentication mechanism of the trusted third party is shown as Table 6.

TABLE 6

| MESSAGES | DESCRIPTION OF MESSAGE FIELDS |
|---|---|
| HTTP/1.1 200 OK | HTTP Command Line |
| Ext | |
| Cache-control:no-cache="Ext" | |
| TargetDeviceId | Target Device Identification |
| SourceDeviceId | Source Device Identification |
| Return Code | Response State Code Indicating authentication result, and possibly containing information on failure reasons |
| AcknowledgeId | Sequence Number of Response Message Corresponding to sequence number of request message |
| Content-type:multipart/byteranges; boundary=Key1_Key2 | Type of Message Body |
| Content-length -- Key1_Key2 | Length of Message Body |
| Content-type:application/octet-stream Contents of Key1 --Key1_Key2 | Encrypted Key |
| Content-type:application/octet-stream Contents of Key2 --Key1_Key2 | |

Steps 407-409: the slave device 41 sends the KEY encrypted with KEY2 to the slave device 42, and sends the identification of the common trusted third party (the current master device 40 in the master-slave device group) to the slave device 42, and the slave device 42 may determine from which trusted third party the slave device 41 acquires the key according to the identification of the master device 40 so as to perform a decryption for obtaining the KEY; the slave device 42 sends a message for acknowledging the reception of the KEY to the slave device 41, and sets the slave device 41 into a trusted device; the slave device 41 decrypts the KEY1 to obtain the KEY, and encrypts the request message with the KEY for sending to the slave device 42, and the slave device 42 decrypts with the KEY, and encrypts the response message with the KEY for returning to the slave device 41, and the slave device 41 decrypts with the KEY so as to implement the interactions.

Figure 5:
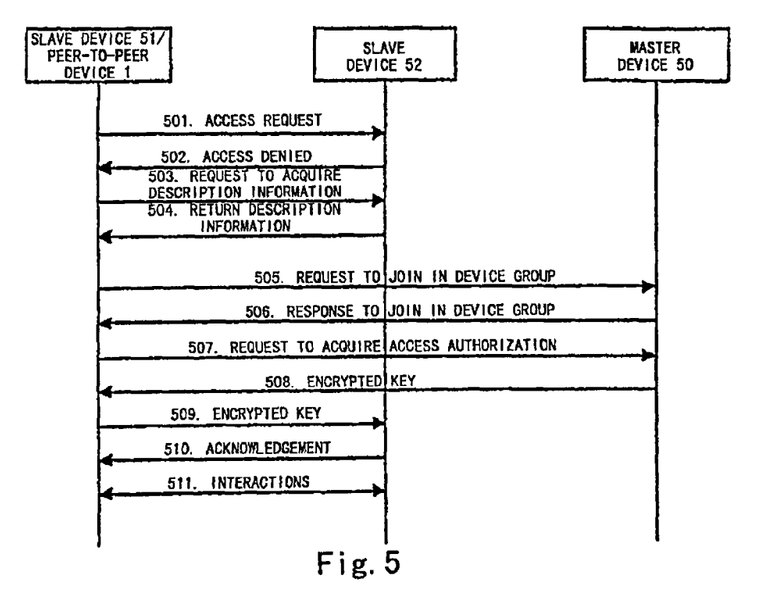
FIG. 5 is a diagram of an embodiment for interactions between any two devices through a trusted third party.

In order to interactive with a slave device with no trusted relationship in the is master-slave device group, one peer-to-peer device in the peer-to-peer device group may actively join in the master-slave device group and with the aids of the trusted third party such as the master device, performs the interactions. In the present embodiment, the peer-to-peer device 1 is going to access the slave device 52, and has no trusted relationship therewith. As shown in FIG. 5, the procedure involves the following steps.

Steps 501-502: the peer-to-peer device 1 initiates an access request to the slave device 52; and the slave device 52 finds that the peer-to-peer device 1 is not a trusted device thereof so returns a response to deny the access.

Steps 503-504: the peer-to-peer device 1 sends a request to acquire a device description of the slave device 52 to the slave device 52; the slave device 52 sends its own device description information in which information on its trusted third parties is contained, to the peer-to-peer device 1, the description information of the slave device 52 is for example shown as follows:
<DeviceDescription>
<DeviceId>Slave Device 52 Id</DeviceId>
<DeviceSecurityDescription>
<DeviceSecurityId>
urn: 3rdPartyAuthenService:3rdAuthProtocol_Kerberosv5: RSA-1024: AuthenServiceProvider: Master Device Identification: Authentication Service Identification Provided: AES-128-128: MD5
</DeviceSecurityId>
</DeviceSecurityDescription>
. . .

Step 505: in order to access the slave device 52, based on the identification of the trusted third party and authentication service identification provided in the device description of the slave device 52, the peer-to-peer device 1 initiates a request to join in the master-slave device group to which the slave device 52 belongs, to the master device 50 of the master-slave device group. In the present embodiment, the trusted third party is the master device 50.

Step 506: the peer-to-peer device 1 and the master device 50 have the trusted relationship therebetween, and after authenticating, the master device 50 allows it to join in the device group, as a slave device 51.

Step 507: since the slave device 51 and the slave device 52 belong to one and the same master-slave device group, the slave device 51 requests to the master device 50, an authorization for acquiring the access to the slave device 52.

Step 508: since the master device 50 has the trusted relationships with the slave device 51 and the slave device 52, the master device 50 returns to the slave device 51 a message encryption key KEY for performing secure interactions between the slave device 51 and the slave device 52, and the KEY is encrypted with an encryption key KEY1 previously shared between the master device 50 and the slave device 51; at the same time, the KEY is encrypted with an encryption key KEY2 shared between the master device 50 and the slave device 52; and then these two respectively encrypted keys are sent to the slave device 51.

Steps 509-511: the slave device 51 sends the KEY encrypted with KEY2 to the slave device 52, and sends the identification of the common trusted third party (the current master device 50 in the master-slave device group) to the slave device 52, and the slave device 52 may determine from which trusted third party the slave device 51 acquires the key according to the identification of the master device 50 so as to perform a decryption for obtaining the KEY; the slave device 52 sends a message for acknowledging the reception of the KEY to the slave device 51, and sets the slave device 51 into a trusted device; the slave device 51 decrypts the KEY1 to obtain the KEY, and encrypts the request message with the KEY for sending to the slave device 52, and the slave device 52 decrypts with the KEY, and encrypts the response message with the KEY for returning to the slave device 51, and the slave device 51 decrypts with the KEY so as to implement the interactions.

Figure 8:
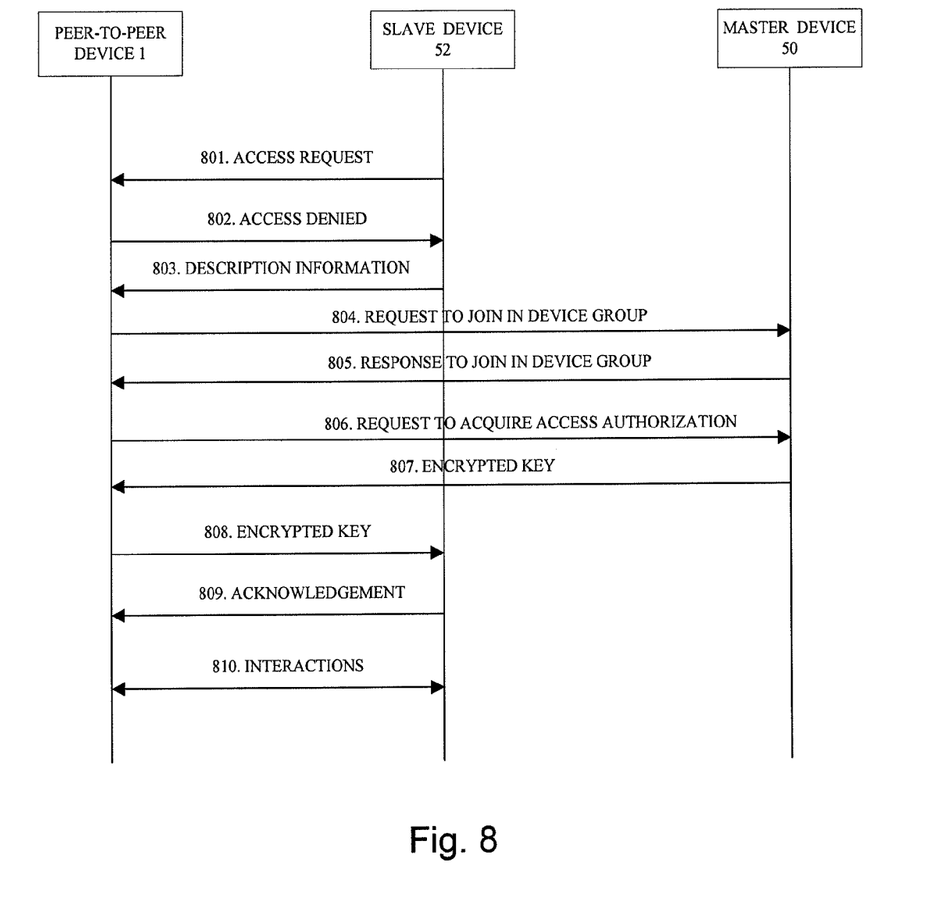
FIG. 8 is a diagram of another embodiment for interactions between any two devices through a trusted third party.

If the slave device 52 is going to access the peer-to-peer device 1, similarly, the peer-to-peer device 1 is made to join in the master-slave device group to which the slave device 52 belongs, and the process procedure as shown in FIG. 8 including Steps 801-810 is similar to the description about Steps 501-511.

Figure 6:
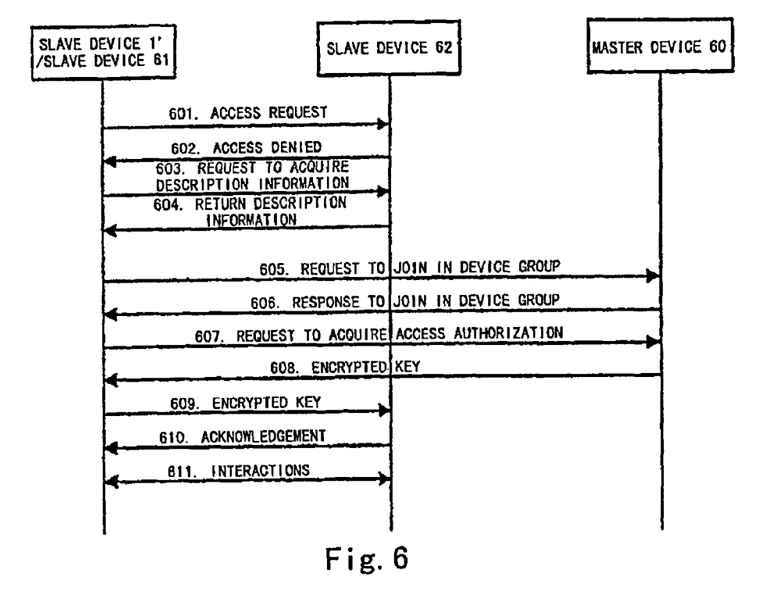
FIG. 6 is a diagram of another embodiment for interactions between any two devices through a trusted third party.

In order to interactive with a slave device with no trusted relationship in another master-slave device group, one master or slave device in one master-slave device group may actively join in the another master-slave device group and with the aids of the trusted third party such as the master device, performs the interactions. In the present embodiment, a slave device 1' belongs to a master-slave device group A, and a slave device 62 belongs to a master-slave device group B, the slave device 1' is going to access the slave device 62, and has no trusted relationship therewith. As shown in FIG. 6, the procedure involves the following steps.

Steps 601-602: the slave device 1' initiates an access request to the slave device 62; and since the slave device 1' is not a trusted device thereof, the slave device 62 returns a response to deny the access.

Steps 603-604: the slave device 1' sends a request to acquire a device description of the slave device 62 to the slave device 62; the slave device 62 sends its own device description information in which information on its trusted third parties is contained, to the slave device 1', the description information of the slave device 62 is for example shown as follows:
<DeviceDescription>
<DeviceId>Slave Device 62 Id</DeviceId>
<DeviceSecurityDescription>
<DeviceSecurityId>
urn: 3rdPartyAuthenService:3rdAuthProtocol_Kerberosv5: RSA-1024: AuthenServiceProvider: Master Device Identification: Authentication Service Identification Provided: AES-128-128: MD5
</DeviceSecurityId>
</DeviceSecurityDescription>
...

Step 605: in order to access the slave device 62, based on the identification of the trusted third party and authentication service identification provided in the device description of the slave device 62, the slave device 1' initiates a request to join in the master-slave device group B to which the slave device 62 belongs, to the master device 60 of the master-slave device group B. In the present embodiment, the trusted third party is the master device 60 of the master-slave device group B.

Step 606: the slave device 1' and the master device 60 have the trusted relationship therebetween, and after authenticating, the master device 60 allows it to join in the device group, as a slave device 61 of the master-slave device group B.

Steps 607-608: since the master device 60 has the trusted relationships with the slave device 61 and the slave device 62, the master device 60 returns to the slave device 61 a message encryption key KEY for performing secure interactions between the slave device 61 and the slave device 62, and the KEY is encrypted with an encryption key KEY1 previously shared between the master device 60 and the slave device 61; at the same time, the KEY is encrypted with an encryption key KEY2 shared between the master device 60 and the slave device 62; and then these two respectively encrypted keys are sent to the slave device 61.

Steps 609-611: the slave device 61 sends the KEY encrypted with KEY2 to the slave device 62, and sends the identification of the common trusted third party (the current master device 60 in the master-slave device group) to the slave device 62, and the slave device 62 may determine from which trusted third party the slave device 61 acquires the key according to the identification of the master device 60 so as to perform a decryption for obtaining the KEY; the slave device 62 sends a message for acknowledging the reception of the KEY to the slave device 61, and sets the slave device 61 into a trusted device; the slave device 61 decrypts the KEY1 to obtain the KEY, and encrypts the request message with the KEY for sending to the slave device 62, and the slave device 62 decrypts with the KEY, and encrypts the response message with the KEY for returning to the slave device 61, and the slave device 61 decrypts with the KEY so as to implement the interactions.

Figure 7:
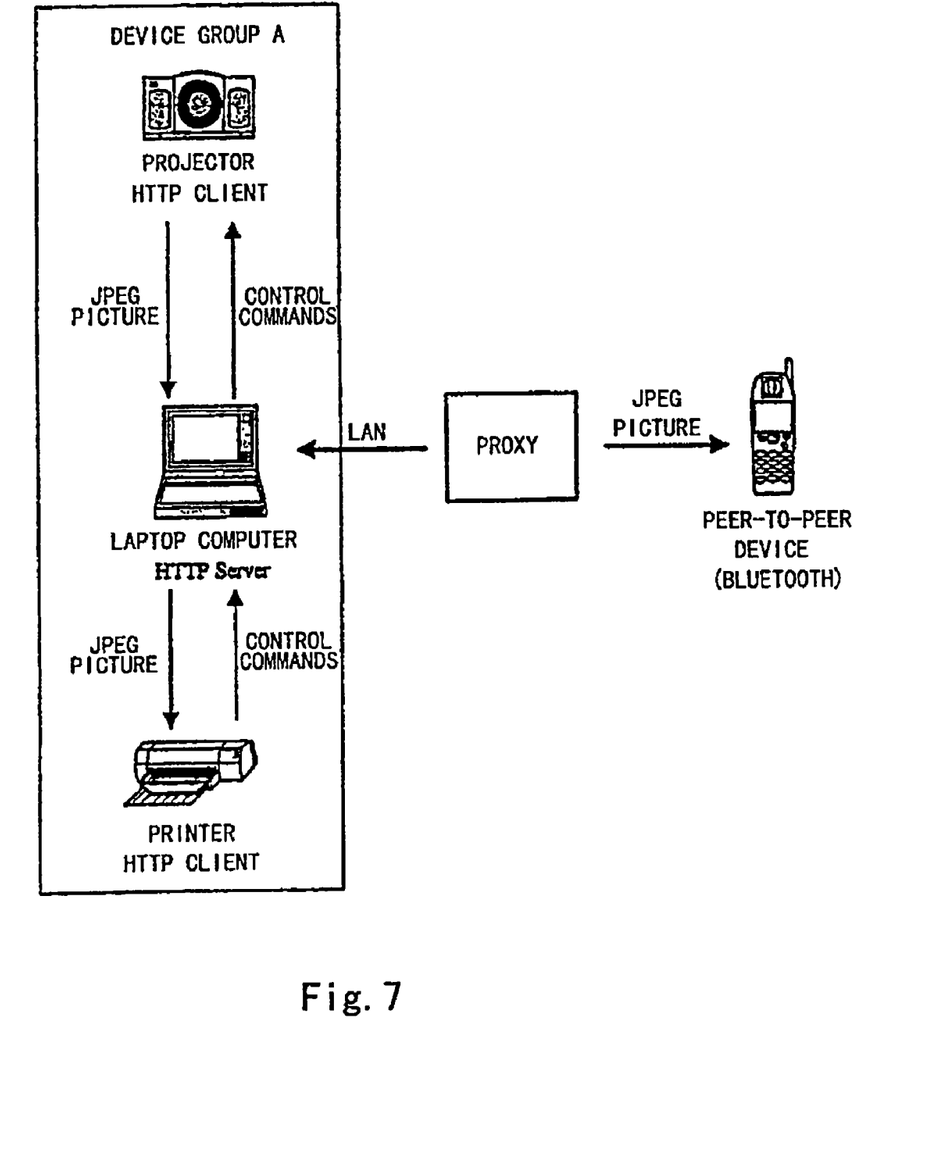
FIG. 7 is a diagram of a concrete example applying the inventive method.

FIG. 7 shows a concrete example applying the inventive method. As shown in FIG. 7, there are three devices on a network, a laptop computer, a projector and a printer which form a device group A. This device group can provide a function of displaying received text or picture information on a screen and printing it, and can be used in a meeting room or family environment. The device group may be a master-slave device group or a peer-to-peer device group, herein using the master-slave device group as an example.

Since the master-slave device group A has been established, an advertisement message of the master-slave device group A will continuously exist in the network, and at the same time, the master-slave device group A will advertise its functions in a multicast or broadcast manner. For example, the advertisement message may carry input interface parameters of the master-slave device group A to indicate that the master-slave device group A can display and print input texts/JPEG images.

The input interface in the master-slave device group A is embodied by a program on the laptop computer, the output is embodied by the projector and the printer controlled by another program on the laptop computer, and the interaction between the laptop computer and the projector, and the interaction between the laptop computer and the printer are interactions within the device group, and are invisible to devices outside the group. Inside the master-slave device group, the laptop computer, the projector and the printer communicate with one another through the HTTP protocol in which the laptop computer serves as an HTTP Server and the projector and the printer serve as HTTP Client.

A mobile phone, as a peer-to-peer terminal, wants to project its shot content for sharing and print it into a photo, that is to say, the mobile phone needs to access the master-slave device group A. Since the mobile phone used in the present embodiment is a Bluetooth® mobile phone, in FIG. 7, a proxy is used for converting between the Bluetooth and the Ethernet protocols.

After knowing the input interface of the master-slave device group A and a device where the input interface is located by sensing the multicast messages, the mobile phone can initiate invocation to the device. Particularly, the mobile phone initiates invocation to the laptop computer, and sends a shot picture to an address port monitored by the application program which embodies the input interface on the laptop computer via HTTP POST. After receiving the picture through the monitored address port, the program which embodies the input interface on the laptop computer uses control commands to instruct the projector to take a specified JPEG picture away by using an HTTP GET command for displaying; at the same time, it uses control commands to instruct the printer to take a specified JPEG picture away by using an HTTP GET command for printing.

In the present embodiment, if the mobile phone and the laptop computer have no trusted relationship, then the mobile phone is required to firstly join in the to master-slave device group A and thereafter interact, as a slave device, with the laptop computer.

Aforementioned are only the best embodiments of the present invention, and are not intended to limit the protection scope of the present invention.

What is claimed is:

1. A method for implementing device grouping and interactions between grouped devices, wherein in a network, a device creating a device group sends an advertisement message carrying identification information of a device group to which it belongs, to the network; and after receiving the advertisement message, a network device which wants requests to join in the corresponding device group joins in the device group identified by the corresponding advertisement message, when two grouped network devices interact with each other, the method further comprising:

sending by an initiating device, an access request to an accessed device; judging by the device receiving the access request, whether the device sending the request is a trusted device thereof or not, if so, interacting by both parties with each other; otherwise, denying the access request, or determining by the initiating device and the accessed device, a common trusted third party; acquiring by the initiating device, key information of the accessed device from the common trusted third party, and interacting with the accessed device by using the acquired key information,     wherein said accessed device belongs to a master-slave device group, and determining by the initiating device and the accessed device, a common trusted third party comprises: judging by the initiating device, whether the initiating device belongs to one and the same master-slave device group as the accessed device, if so, using a master device as the common trusted third party; otherwise, joining by the initiating device, as a slave device, in a master-slave device group to which the accessed device belongs, and then using a master device of the master-slave device group in which the initiating device joins as the common trusted third party.

2. The method according to claim 1, wherein said initiating device belongs to a master-slave device group, and joining in the device group identified by the advertisement message comprises: sending by the network device requesting to join in the device group, a join-in request to a master device in the device group to be joined in; determining by the master device, based on preset information, whether the network device requesting to join in the device group is allowed to join in, and returning a response message carrying an authorization result to the network device requesting to join in the device group.

3. The method according to claim 2, wherein if the authorization result in the response message is "deny to join-in", then the message further carries information on deny reasons.

4. The method according to claim 1, wherein prior to joining by the initiating device in the master-slave device group to which the accessed device belongs, the method further comprises:

acquiring by the initiating device, description information of the accessed device from the accessed device.

5. The method according to claim 1, wherein the initiating device acquires both an encryption key encrypted by a key shared between the common trusted third party and the initiating device and an encryption key encrypted by a key shared between the common trusted third party and the accessed device, and then sends the encryption key encrypted by the key shared between the common trusted third party and the accessed device to the accessed device.

6. The method according to claim 1, further comprising: after acquiring the key information of the accessed device, sending by the initiating device, the key information to the accessed device.

7. The method according to claim 6, wherein the initiating device acquires both an encryption key encrypted by a key shared between the common trusted third party and the initiating device and an encryption key encrypted by a key shared between the common trusted third party and the accessed device, and then sends the encryption key encrypted by the key shared between the common trusted third party and the accessed device to the accessed device.

8. A method for implementing device grouping and interactions between grouped devices, wherein in a network, a device creating a device group sends an advertisement message carrying identification information of a device group to which it belongs, to the network; and after receiving the advertisement message, a network device which requests to join in the corresponding device group joins in the device group identified by the corresponding advertisement message, when two grouped network devices interact with each other, the method further comprising:

sending by an initiating device, an access request to an accessed device; judging by the device receiving the access request, whether the device sending the request is a trusted device thereof or not, if so, interacting by both parties with each other; otherwise, denying the access request, or determining by the initiating device and the accessed device, a common trusted third party; acquiring by the initiating device, key information of the accessed device from the common trusted third party, and interacting with the accessed device by using the acquired key information,     wherein said initiating device belongs to a master-slave device group, said accessed device belongs to a peer-to-peer device group, and determining by the initiating device and the accessed device, a common trusted third party comprises: joining by the accessed device, as a slave device, in a master-slave device group to which the initiating device belongs, and then using a master device of the master-slave device group in which the accessed device joins as the common trusted third party.

9. The method according to claim 8, wherein prior to joining by the accessed device in the master-slave device group to which the initiating device belongs, the method further comprises:

acquiring by the accessed device, description information of the initiating device from the initiating device.

10. The method according to claim 8, wherein the initiating device acquires both an encryption key encrypted by a key shared between the common trusted third party and the initiating device and an encryption key encrypted by a key shared between the common trusted third party and the accessed device, and then sends the encryption key encrypted by the key shared between the common trusted third party and the accessed device to the accessed device.

11. The method according to claim 8, further comprising: after acquiring the key information of the accessed device, sending by the initiating device, the key information to the accessed device.

12. The method according to claim 11, wherein the initiating device acquires both an encryption key encrypted by a key shared between the common trusted third party and the initiating device and an encryption key encrypted by a key shared between the common trusted third party and the accessed device, and then sends the encryption key encrypted by the key shared between the common trusted third party and the accessed device to the accessed device.

13. A method for implementing device grouping and interactions between grouped devices, wherein in a network, a device creating a device group sends an advertisement message carrying identification information of a device group to which it belongs, to the network; and after receiving the advertisement message, a network device which requests to join in the corresponding device group joins in the device group identified by the corresponding advertisement message, when two grouped network devices interact with each other, the method further comprising:

sending by an initiating device, an access request to an accessed device; judging by the device receiving the access request, whether the device sending the request is a trusted device thereof or not, if so, interacting by both parties with each other; otherwise, denying the access request, or determining by the initiating device and the accessed device, a common trusted third party; acquiring by the initiating device, key information of the accessed device from the common trusted third party, and interacting with the accessed device by using the acquired key information, wherein said initiating device and said accessed device both belong to a peer-to-peer device group, and determining by the initiating device and the accessed device, a common trusted third party comprises: informing by the initiating device, all trusted third parties thereof to the accessed device; judging by the accessed device, whether there are any same trusted third parties as its own in all the trusted third parties of the initiating device; if so, selecting one of the same ones as the common trusted third party.

14. The method according to claim 13, wherein joining in the device group identified by the advertisement message comprises: adding the device group identification carried by the advertisement message into a device group identification list of the network device requesting to join in the device group.

15. The method according to claim 13, wherein the initiating device acquires both an encryption key encrypted by a key shared between the common trusted third party and the initiating device and an encryption key encrypted by a key shared between the common trusted third party and the accessed device, and then sends the encryption key encrypted by the key shared between the common trusted third party and the accessed device to the accessed device.

16. The method according to claim 13, further comprising: after acquiring the key information of the accessed device, sending by the initiating device, the key information to the accessed device.

17. The method according to claim 16, wherein the initiating device acquires both an encryption key encrypted by a key shared between the common trusted third party and the initiating device and an encryption key encrypted by a key shared between the common trusted third party and the accessed device, and then sends the encryption key encrypted by the key shared between the common trusted third party and the accessed device to the accessed device.

* * * * *